US008753204B2

(12) United States Patent
Manton et al.

(10) Patent No.: US 8,753,204 B2
(45) Date of Patent: Jun. 17, 2014

(54) METHOD AND SYSTEM FOR RENDERING VIRTUAL IN-GAME ENVIRONMENTS

(75) Inventors: Douglas Manton, San Francisco, CA (US); Andrew Foster, Irving, TX (US)

(73) Assignee: Zynga Inc., San Francisco, CA (US)

( * ) Notice: Subject to any disclaimer, the term of this patent is extended or adjusted under 35 U.S.C. 154(b) by 0 days.

(21) Appl. No.: 13/608,635

(22) Filed: Sep. 10, 2012

(65) Prior Publication Data

US 2013/0116046 A1 May 9, 2013

Related U.S. Application Data

(60) Provisional application No. 61/557,280, filed on Nov. 8, 2011.

(51) Int. Cl.
 *A63F 9/24* (2006.01)
(52) U.S. Cl.
 USPC .............................................. 463/31; 463/42
(58) Field of Classification Search
 USPC ....................................................... 463/42, 31
 See application file for complete search history.

(56) References Cited

U.S. PATENT DOCUMENTS

| 7,637,806 B2 | 12/2009 | Rhyne, IV et al. |
| 2004/0143852 A1 | 7/2004 | Meyers |
| 2010/0107214 A1 | 4/2010 | Ganz |
| 2011/0225538 A1 | 9/2011 | Oyagi et al. |

FOREIGN PATENT DOCUMENTS

WO WO-2013070310 A1 5/2013

OTHER PUBLICATIONS

Doom II User Manual, Windows 1995-compatible version, dated at least as early as 1995, All pages.*
Doom II Cheat Manual, Windows-1995 compatible version, copyright on p. 9 as early as 1995.*
"International Application Serial No. PCT/US2012/054446, International Search Report and Written Opinion mailed Jul. 12, 2012", 12 pgs.
"Build an Island Town", [Online]. Retrieved from the Internet. http://itunes.apple.com/us/app/tap-paradise-cove/id488845680?Is=1&mt=8, (Accessed Aug. 24, 2012), 3 pgs.
"Rise of Nations", [Online]. Retrieved from the Internet. www.microsoft.com/games/riseofnations/default.aspx, (Accessed Aug. 24, 2012), 2 pgs.
"Screen shots from Tap Paradise Cove from Pocket Gems Inc.", [Online]. Retrieved from the Internet. http://venturebeat.files.wordpress.com/2012/03/paradise-cove.jpg?w=558&h=9999&crop=0, (Accessed Aug. 24, 2012), 2 pgs.
"Screenshot of Rise of Nations", [Online]. Retrieved from the Internet. http://www.firingsquad.com/media/article_image.asp/1210/02, (Accessed Aug. 24, 2012), 3 pgs.
"Tap Paradise Cove", iTunes Preview, Pocket Gems, Inc., (00/00/2011), 4 pgs.

* cited by examiner

*Primary Examiner* — Omkar Deodhar
(74) *Attorney, Agent, or Firm* — Schwegman Lundberg & Woessner, P.A.

(57) ABSTRACT

Disclosed in some examples is a method of providing a computer-implemented game, the method includes rendering a display of a virtual in-game environment comprising an unlocked area and a locked area, an in-game player character controlled by a player of the game having access to the unlocked areas but being restricted from accessing the locked area; and using one or more processors, applying a visual effect to the locked area to distinguish the locked area from the unlocked area, the visual effect revealing one or more aspects of the unlocked area.

22 Claims, 9 Drawing Sheets

METHOD AND SYSTEM FOR RENDERING VIRTUAL IN-GAME ENVIRONMENTS

CLAIM OF PRIORITY

This patent application claims the benefit of priority, under 35 U.S.C. Section 119(e), to U.S. Provisional Patent Application Ser. No. 61/557,280, entitled "Method and System for Rendering Virtual In-Game Environments," filed on Nov. 8, 2011 to Manton, et al., which is hereby incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright ZYNGA INC., All Rights Reserved.

TECHNICAL FIELD

This disclosure generally relates to games and applications in general and in particular to computer-implemented online games, such as online role-playing games (RPGs), playable by more than one person from more than one location.

BACKGROUND

Map-based computer games generally involve visually representing a virtual in-game environment or virtual world of the game through a map based perspective. Typically, this involves displaying the virtual world as a plane on which various game objects are displayed in certain spatial locations relative to other game objects. A player of the game navigates a character throughout the world by utilizing one or more inputs. The graphical image of the character is then moved in response to those inputs on the map, giving an impression that the player is viewing the action of the game in a "birds-eye" view.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
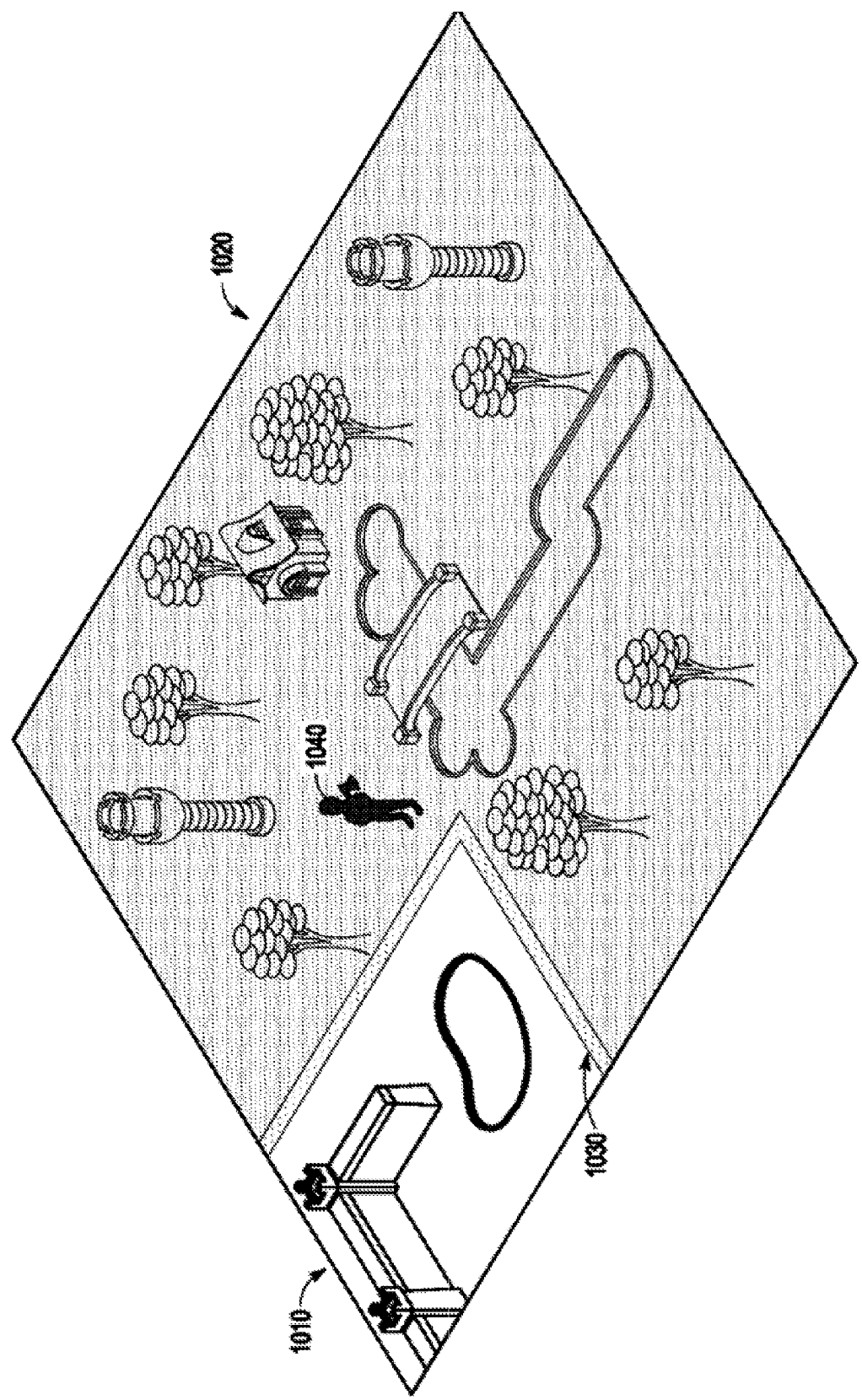
FIG. 1 shows a line drawing representation of gloomed and ungloomed areas according to some examples of the present disclosure.

A map-based game may limit the areas of the map to which a virtual game character which is controlled by a player can travel to, or otherwise interact with. In some examples, the map may be divided up into one or more sections or areas. Each section may have a set of one or more requirements for allowing the character to travel to, or otherwise interact with that particular section. Before a game character has completed the requirements of a particular section, that section may be considered "locked." The character cannot travel to, or otherwise interact with locked areas. Once the requirements are met, the section is unlocked and the character may travel to and interact with the unlocked area.

Disclosed in some examples are a method, system and machine readable medium for displaying locked map sections to game players. In some examples, the locked sections and/or the objects within those locked sections may be rendered along with the unlocked sections but may be rendered using one or more visual effects which convey to the game player that the section is locked and is therefore inaccessible to the player character controlled by the player. In some embodiments, the locked area of a virtual in-game environment or map is an area which has not yet been explored by the player and/or to which the associated player character does not have access. The visual effect may obscure one or more properties of the locked area or section and in some examples, the effects may obscure one or more properties of objects located within those locked areas or sections. Example properties include color, size, shape, or identity. The visual effect may be applied to the locked area and/or objects within those areas such that at least some aspects or properties of the locked or unexplored areas and/or the objects within those areas are revealed to the player even though the player character has not yet travelled to the locked area and does not currently have access to the locked area. The locked area may, for example, be displayed such that locations of respective in-game objects and/or non-player characters are visible, even though such objects and/or characters are not displayed fully. A topological layout of the locked area may also be revealed, for example showing the full extent of the locked area, and/or showing the location of environmental features such as forests, rivers, bridges, buildings, or the like.

This may be beneficial in that it may give game players a glimpse into the unexplored (and unavailable) portions of the map in an effort to encourage players to continue playing and to assist in decision-making with respect to unlocking new areas. In yet other examples, special previews may be provided to game players who attempt to interact with the locked areas of one or more game objects or portions of the locked sections by removing one or more of the applied effects temporarily, or by providing one or more additional preview effects or teaser messages.

In some examples, the requirements for unlocking map areas may include accomplishment of a game-play objective, paying a fee, or paying in-game currency or tokens. Game-play objectives may include completing specific tasks, or completing a series of one or more tasks. Example game-play objectives include defeating an in-game villain character, accumulating enough experience points through one or more battles with in-game villain characters, harvesting enough crops, utilizing enough energy points, or the like. In game currency or tokens may be accumulated by completing one or more game-play objectives or may be accumulated by purchasing them with real money. Game state data may be used to store any data necessary to describe an instance of the game, and may include the states of various game objects, game player data (e.g. accomplishments, accumulated virtual objects, and whether one or more game-play objectives have been achieved). The system may consult the game state data to determine whether game play objectives necessary to unlock one or more of the map sections have been achieved or whether or not the player has enough in-game currency to purchase one or more of the locked map sections.

Game objects placed on the map may include any object within the game to which the game player can interact with and may include trees, rocks, plants, water features, in game characters, structures, paths, roads, bridges, or the like.

The method may comprise rendering the map such that the total of the displayed unlocked area and the total of the displayed gloomed area together constitute the totality of potentially accessible areas in the particular map. A player is thus enabled to view the entire extent of potential in-game exploration that is possible with respect to the particular map. Each such totally displayed map may be with respect to an in-game territory uniquely associated with a particular player, or may be with respect to one of a plurality of levels or realms of a game instance.

In some examples, the locked sections and/or the objects within those locked sections may be rendered using one or more visual effects which convey a visual impression to the game player that the area is locked. The visual effects contrast or distinguish the locked and unlocked portions of the map while obscuring part of the detail of the locked area in order to cultivate mystery. In particular, the locked map sections (and/or any game objects in that map section) may be rendered using one or more dimming, coloring, shading, tinting, texturing, or other effects. In some examples, the locked sections (and/or any game objects in that map section) may be rendered using a bluish or darker tint or hue. Other examples include filling the locked sections with one or more textures such as hash lines, hatch lines, dimples, blur effects (e.g. the objects and the locked section are given a blurry look), or the like. For ease of description, locked map sections, objects, or areas which have been rendered using the one or more visual effects may be referred to herein as "gloomed areas" or "gloomed sections," and the process of applying the one or more visual effects to those sections may be called "glooming." The result of glooming being done on a particular section may be referred to as a "gloomed" section.

Other examples of creating the gloomed effect include changing the actual topographical representation of the virtual land within that map section by rendering it using a different texture which highlights the locked (or gloomed) nature of the section. For example, if the topography is grass, a special grass texture for the gloomed areas may be created which may be different than the grass texture for unlocked sections, if the topography is desert, a different, gloomed desert texture may be utilized, and so on. For example, grass in unlocked areas may have a lawn-like appearance while grass in gloomed areas may have a wilder, unkempt appearance. In some examples the rendering effects applied to the map sections (e.g. the glooming of the map sections such as the application of the bluish tint) may also be applied to the different object textures. Thus for example, the gloomed grass texture may be tinted dark blue to match the surrounding tinted (e.g. gloomed) map sections.

In some examples, multiple effects may be utilized to enhance the gloominess of the gloomed areas. For example, the grass areas may be rendered using a gloomed grass texture as well as tinting the map areas which are locked a dark blue tint. In another example, the gloomed section is rendered using a bluish tint as well as a cross-hatch texture.

This glooming effect may give game players a glimpse of other portions of the virtual world to entice game players to finish challenges, pay money, or otherwise take an action to unlock the locked portions of the map. The glimpse players are given entices them with mystery and intrigue of what challenges and excitement await them in the locked map portions. An example map with glooming effects rendered on locked portions is shown in FIG. 1. The unlocked map area is shown as 1010 and the gloomed and locked portion is shown as 1020. The map shows various game objects such as water features, walls placed by the game player, trees, rocks, structures, in-game characters and the like. The various game objects in the gloomed areas are shown in darker shading and the grass texture is different. Transition area 1030 shows a soft transition between the fully bright unlocked areas and the gloomed (locked) areas.

While all objects of the locked area may be gloomed using the same effects, in some examples, each game object may have its own special rules that specify the proper effect to utilize to gloom the object. For example, the gloomed areas of FIG. 1 show one or more in-game characters 1040 as a shadow or silhouette rather than the shading done to the rest of the game objects and the rest of the map. Each in-game object may be represented by a data structure which may specify an effect that should be used to gloom the object. The effects can be in addition to, or a replacement of a default glooming effect. In some examples, additional glooming effects may include shadowing (e.g. showing the object as a shadow), silhouetting, not showing the object at all, applying additional, darker shading, applying lighter shading, or no additional effects (i.e. just the default glooming effect). Not showing objects in the gloomed area may provide game players who unlock the gloomed areas with a surprise.

In some examples, game player interaction with the gloomed areas or objects within the gloomed areas, may not be allowed. In yet other examples, game player interaction with the gloomed areas or individual objects within those areas may cause the game to show previews of the gloomed areas for the game players. These previews comprise the application of one or more preview effects to the map sections or objects within those map sections which may entice game players to unlock those map areas or objects. The preview effects may include softening or removing the glooming effects revealing one or more obscured properties of the game object (thus giving players a better view of objects or land which is gloomed and locked), additional effects such as highlighting effects, text boxes, prompts, or the like.

For example, a game player moving the mouse over a gloomed area may trigger a temporarily "ungloom" of a particular object or area under the mouse pointer so the game player may fully preview that object or area. In some examples, the unglooming may be a full unglooming (e.g. the particular object or area under the mouse cursor may be displayed normally as if it were unlocked), or a partial unglooming (e.g. the dark shading may be brightened somewhat, but not completely, or the gloomed topographic textures may be changed to normal textures, or the like). Other previews may include displaying one or more teaser messages. For example, a message may identify the object or a category of the object (e.g. "A house") and may provide one or more messages and prompts to entice the game player into unlocking that map section or game object. In some examples, the previews may provide purchase opportunities to allow the game player to purchase the one or more locked sections or objects within the locked sections. The price for the one or more locked sections may be in real money, in-game currency, or some other currency (e.g. experience points, energy points, or the like). The special previews may last as long as the interaction lasts (e.g. as long as the mouse is over the particular coordinates), or may disappear after a predetermined time has elapsed.

Example interactions with the gloomed area that may trigger previews or teasers include mousing over an area, clicking on an object or area, scrolling to a particular area, or an in-game event (e.g. completing a task may require the purchasing of a gloomed part of the map—in this case, the game may preview the area to call the game player's attention to that area). In some examples, interactions may build on each other. For example, mousing over an area may provide one level of unglooming (e.g. partial unglooming) and clicking on a particular object in the partially ungloomed area may cause the object to be further ungloomed or may trigger a teaser message to be displayed.

In some examples, each gloomed object may respond differently to different interactions. For example, a building may not ungloom on a mouse-over, but may ungloom if clicked on. Each game object may contain an entry in their data structure which defines which events cause a particular preview effect.

Figure 2:
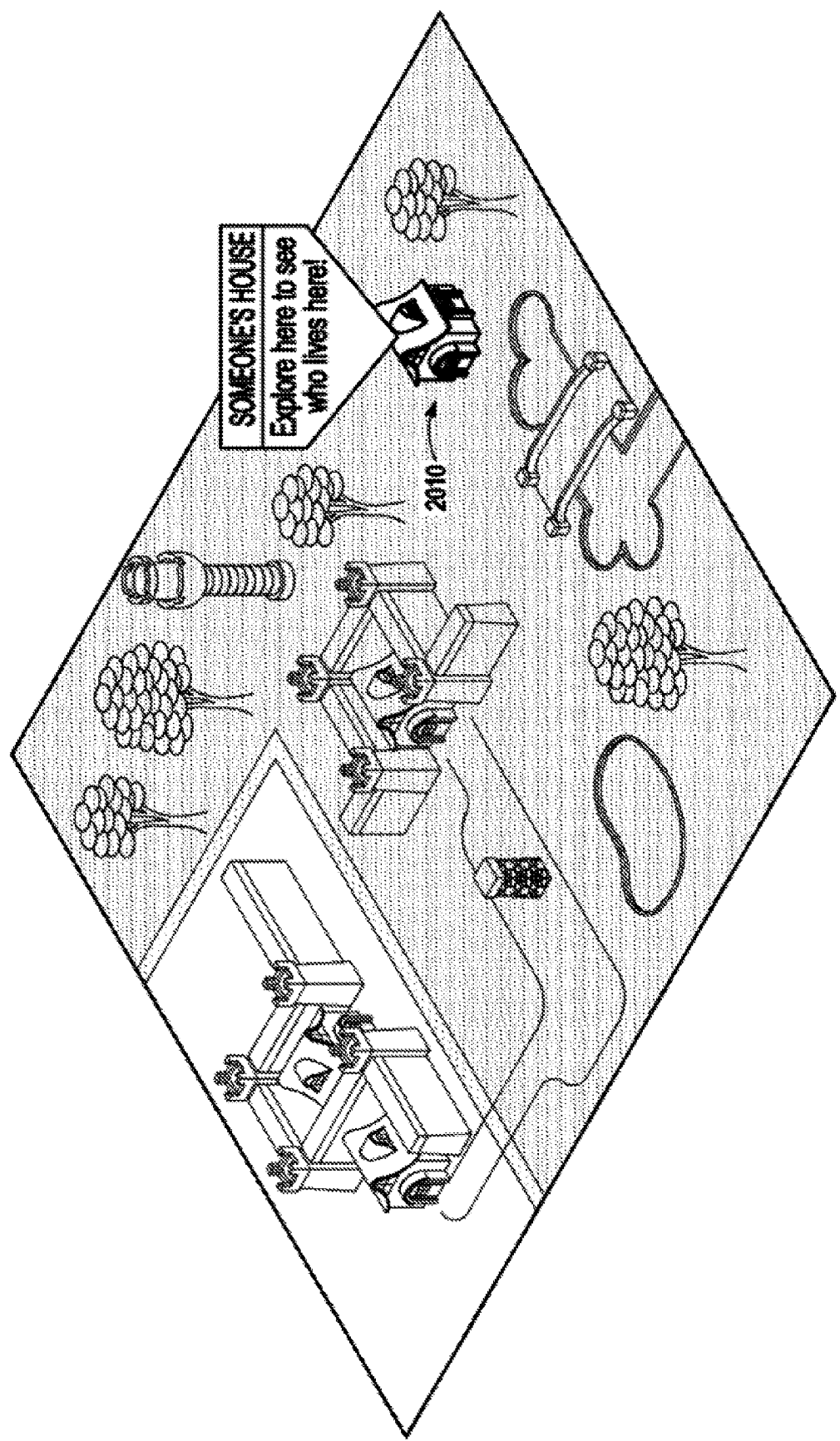
FIG. 2 shows a line drawing representation of gloomed areas, ungloomed areas, and a preview according to some examples of the present disclosure.

FIG. 2 shows a line drawing representation of one example preview. In this example, a player interacted with the house 2010. The house 2010 temporarily ungloomed showing the house as if it were unlocked, with a teaser message stating that the house is "someone's house," and inviting the player to: "Explore here to see who lives here!"

Figure 3:
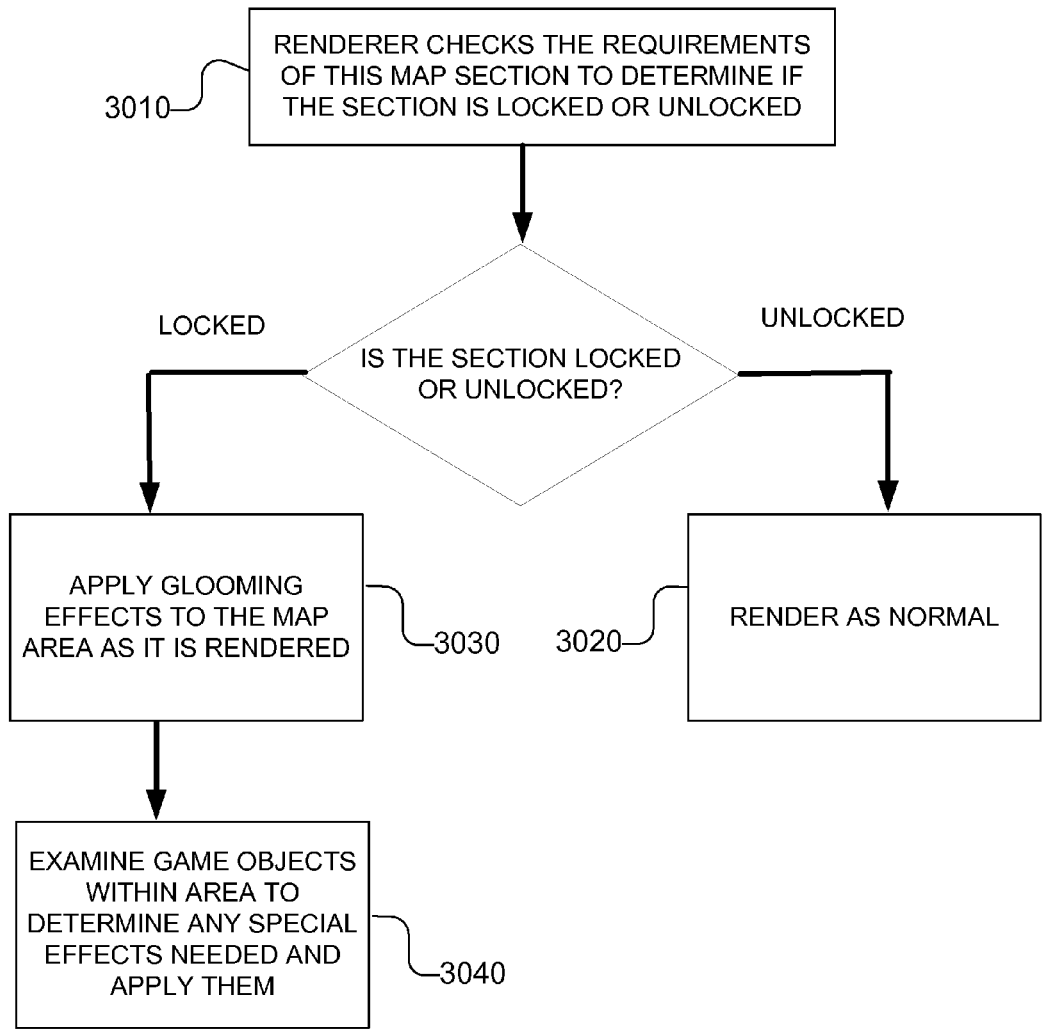
FIG. 3 shows a flowchart of a method of rendering the map according to some examples of the present disclosure.

Turning now to FIG. 3, a method of rendering the map is shown. When the map is being rendered, the rendering engine checks the requirements of each map section to determine if the game player has met the requirements for having that particular section unlocked at operation 3010. If the requirements are met, the section is unlocked, otherwise it is locked. If the section is unlocked, the section is rendered as normal at operation 3020. If the section is locked, the section (and objects within the section) is rendered with glooming effects at operation 3030. Additionally, in some examples, if the section is locked, each object within that section is examined to determine if any special effects are to be applied to that object and to apply those effects at operation 3040.

Figure 4:
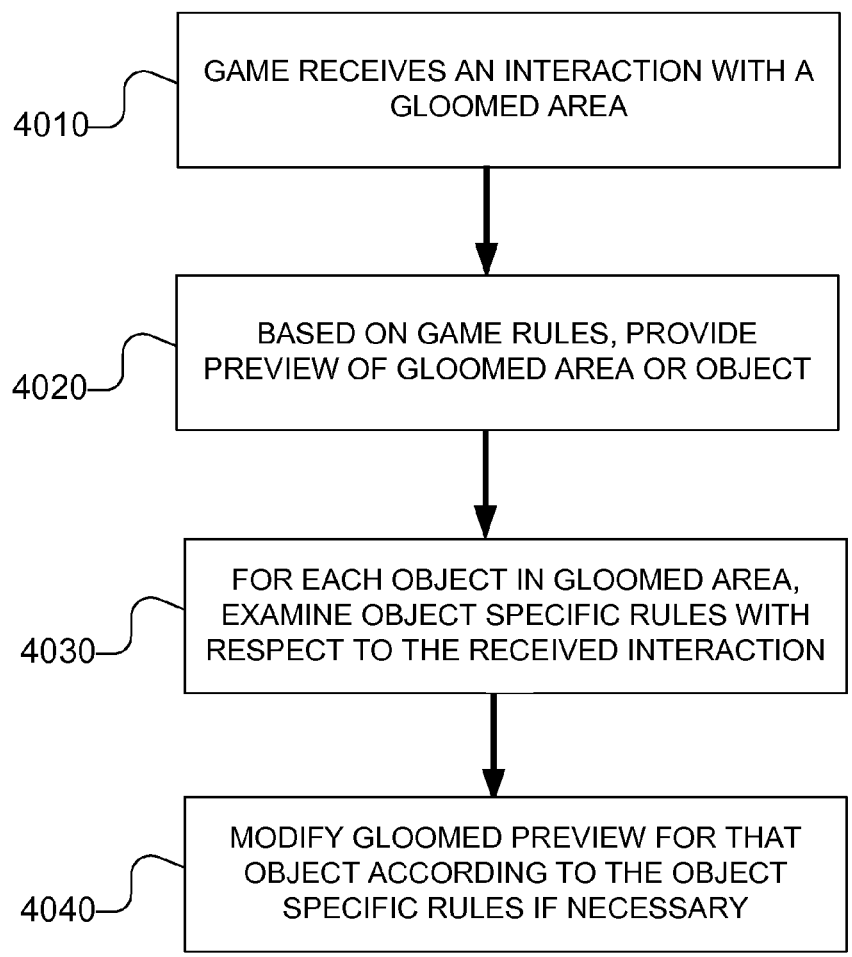
FIG. 4 shows a flowchart of a method of showing previews according to some examples of the present disclosure.

Turning now to FIG. 4, at operation 4010 the game receives one or more interactions with a gloomed area or an object within a gloomed area. The interactions may include mouseovers, clicks, taps, touch gestures, keystrokes, or any other indication of an intention by the game player to interact with a game object or map area. At operation 4020, the game provides a preview of the gloomed area. As previously explained, this may include undoing or reversing all or part of the glooming effects applied to the gloomed area or object. At operation 4030, specific rules for the object interacted with, or the objects within the gloomed area interacted with are consulted to determine any special treatment with respect to that game object and that particular interaction. If necessary, the preview may be modified in accordance with the object specific rules at operation 4040.

Figure 5:
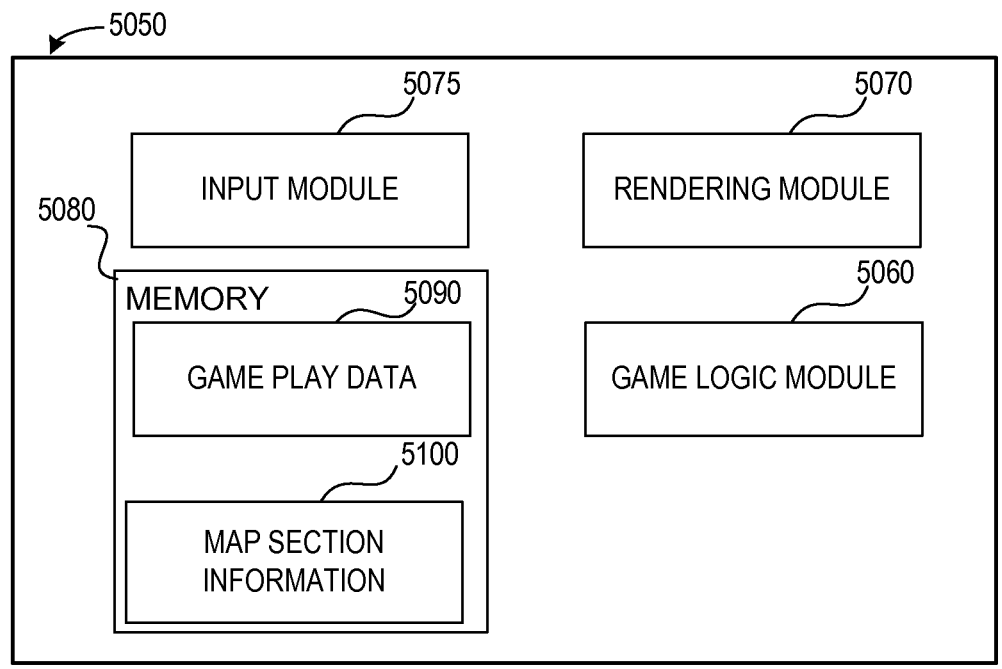
FIG. 5 shows a schematic of a game application according to some examples of the present disclosure.

Turning now to FIG. 5 an example schematic of a game 5050 is shown. Game logic module 5060 comprises the algorithms and rules that control the display, presentation, and functionality of the game, including instructing the rendering module 5070 to render the game map and associated game objects to a display. Rendering module 5070 produces an output of the game map, game objects, game characters and other sprites onto the display in their proper position and orientation.

Input module 5075 may take as input one or more inputs from the game player and pass along the input to game logic module 5060. Game logic module 5060 may update the game state data or game play data 5090 (stored in memory 5080) in response to the user input based on the game rules and may then have rendering module 5070 update the graphical rendering to reflect the updated game play data.

The game state data or game play data may be a data description of all the information necessary to play the game and to keep track of changes in the game. Game play data may include information on particular in-game objects including the appropriate glooming effects to apply and the appropriate preview effects to apply. Game play data also includes information on game-accomplishments of the game player and also purchase history information of the player (e.g. what game objects the user has purchased, or what map sections were purchased). Memory 5080 may be transitory or non-transitory memory such as Random Access Memory (RAM), or more permanent storage such as magnetic storage on a hard disk or storage on a solid state drive, or the like.

Map section information 5100 is stored in memory 5080 and may be used by the game logic module 5060 to determine how to draw the game map and the various associated objects and sprites. Map section information 5100 may store information on the unlocked and locked map sections, the requirements for a map section to move from a locked to an unlocked state, the objects positioned on one or more map sections and the like. Game logic module 5060 may use the particular data in the map section information 5100 and the game play data information 5090 to determine which map sections and which objects are gloomed and what effects to apply as well as to handle inputs from input module 5075 to determine the appropriate preview effects to apply should the user attempt to interact with a gloomed map section or object.

Social Networking Based Games

While the above described disclosures may be applicable to any map-based computer game, in some examples, the game may be a network based game, which may also utilize social networking data. These games and there operation may be described below in more detail.

Figure 6:
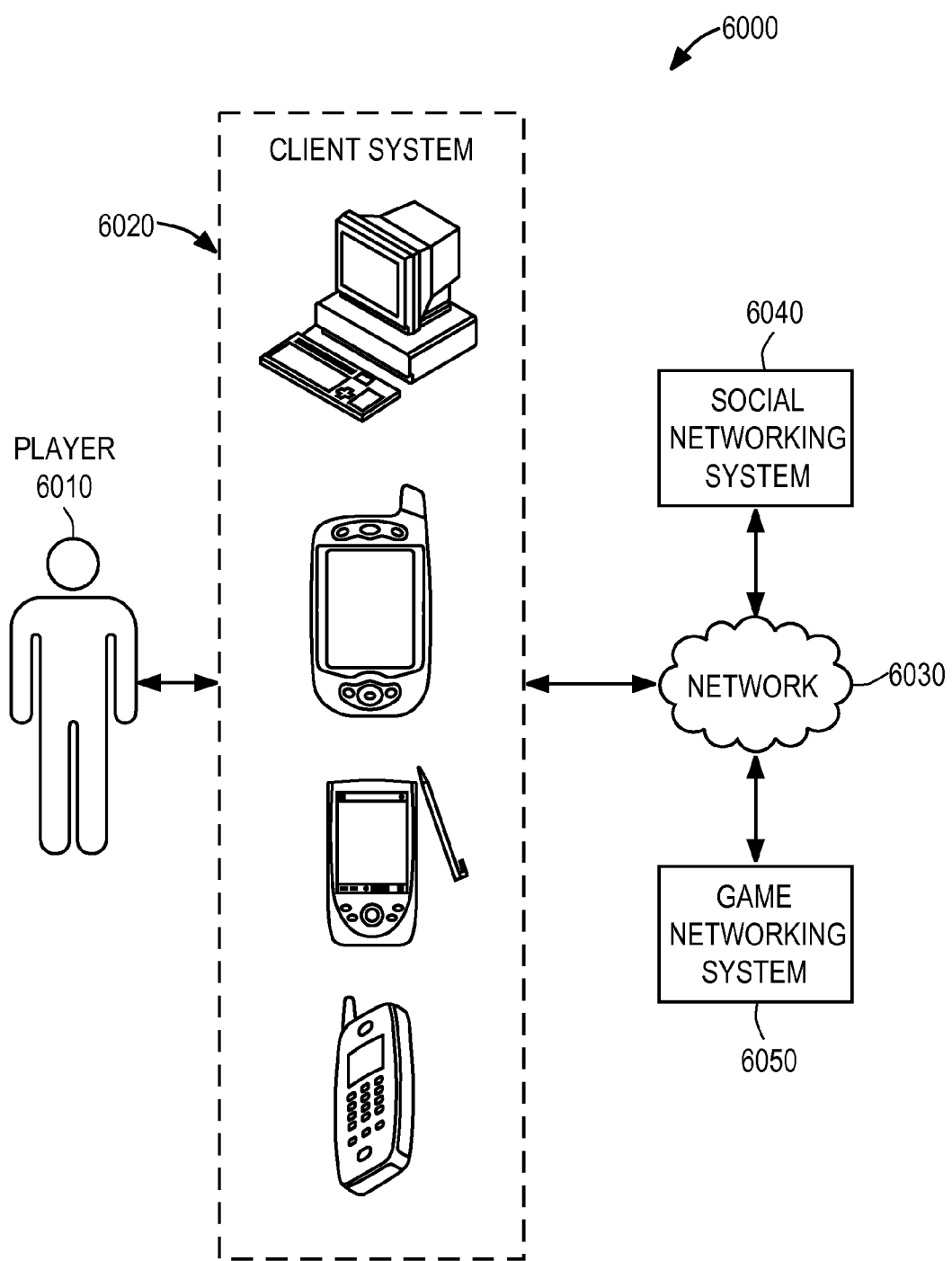
FIG. 6 shows a schematic of a gaming system according to some examples of the present disclosure.

FIG. 6 illustrates an example of a system 6000 for implementing various example embodiments, in connection with a user interface providing a network accessible game. In some embodiments, the system 6000 may comprise a game player 6010, a client device 6020, a network 6030, a social networking system 6040, and a game networking system 6050. The components of the system 6000 may be connected directly or over the network 6030, which may be any suitable network. In various embodiments, one or more portions of the network 6030 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or any other type of network, or a combination of two or more such networks.

The client device 6020 may be any suitable computing device (e.g., devices), such as a smart phone, a personal digital assistant (PDA), a mobile phone, a personal computer, a laptop, a computing tablet, and the like. The client device 6020 may access the social networking system 6040 or the game networking system 6050 directly, via the network 6030, or via a third-party system. For example, the client device 6020 may access the game networking system 6050 via the social networking system 6040. The player 6010 may use the client device 6020 to play the virtual game, within the user interface for the game.

The social networking system 6040 may include a network-addressable computing system that can host one or more social graphs, and may be accessed by the other components of system 6000 either directly or via the network 6030. The social networking system 6040 may generate, store, receive, and transmit social networking data. Moreover, the game networking system 6050 may include a network-addressable computing system (or systems) that can host one or more virtual games, for example, online games provided in Flash interactive displays. The game networking system 6050 may generate, store, receive, and transmit game-related data, such as, for example, game account data, game input, game state data, and game displays. The game networking system 6050 may be accessed by the other components of system 6000 either directly or via the network 6030. The player 6010 may use the client device 6020 to access, send data to, and receive data from the social networking system 6040 and/or the game networking system 6050.

Although FIG. 6 illustrates a particular example of the arrangement of the player 6010, the client device 6020, the social networking system 6040, the game networking system 6050, and the network 6030, this disclosure includes any suitable arrangement or configuration of the these components of system 6000.

Figure 7:
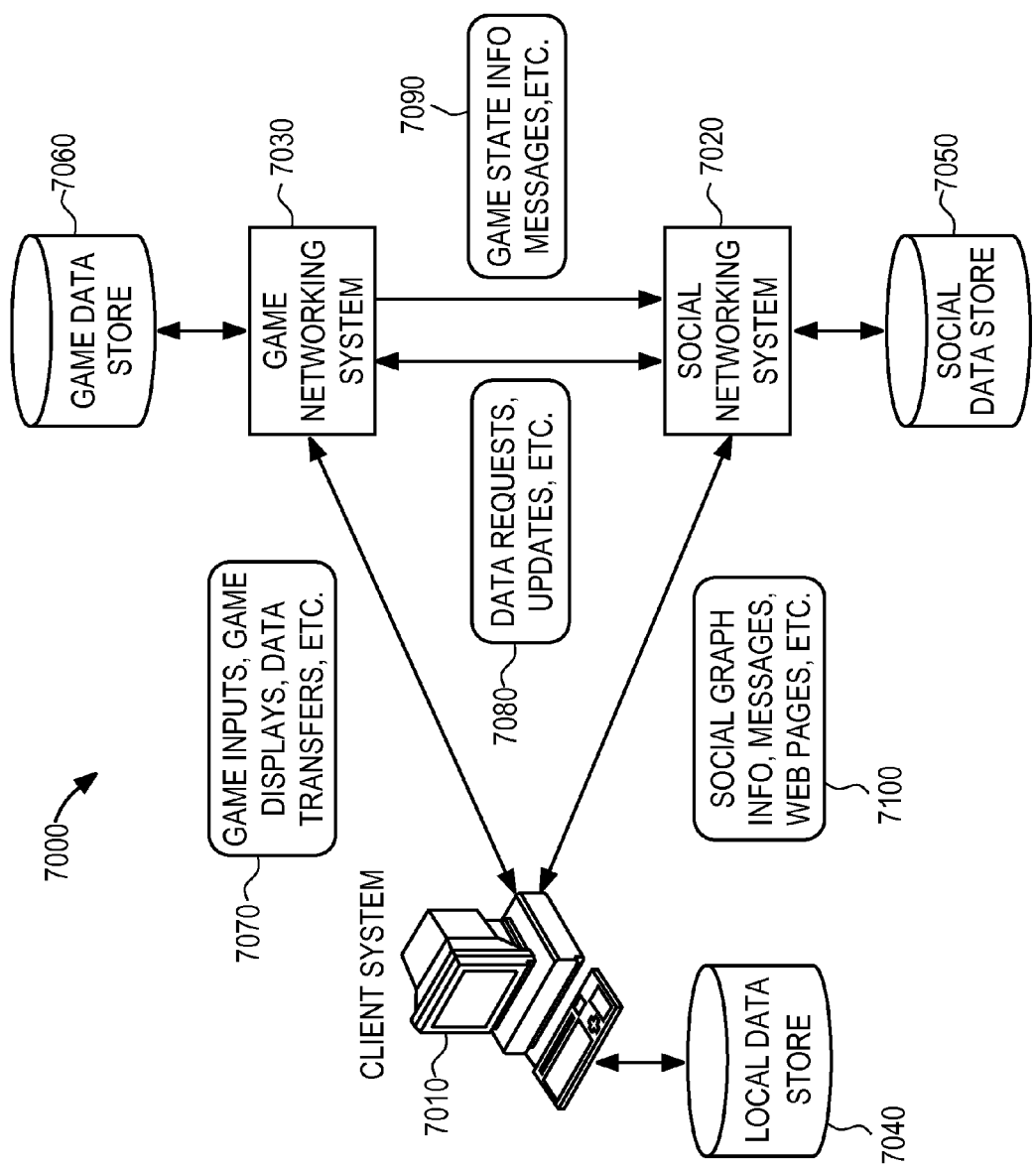
FIG. 7 shows a schematic data flow of a gaming system according to some examples of the present disclosure.

FIG. 7 illustrates an example data flow between the components of an example system 7000. In particular embodiments, system 7000 can include client system 7010, social networking system 7020, and game networking system 7030. A system 7000 such as that described with reference to FIG. 7 may be provided by the client system 7010, the social networking system 7020, or the game networking system 7030, or by any combination of these systems. The components of system 7000 can be connected to each other in any suitable configuration, using any suitable type of connection. The components may be connected directly or over any suitable network. Client system 7010, social networking system 7020, and game networking system 7030 can each have one or more corresponding data stores such as local data store 7040, social data store 7050, and game data store 7060, respectively. Social networking system 7020 and game networking system 7030 can also have one or more servers that can communicate with client system 7010 over an appropriate network. Social networking system 7020 and game networking system 7030 can have, for example, one or more Internet servers for communicating with client system 7010 via the Internet. Similarly, social networking system 7020 and game networking system 7030 can have one or more mobile servers for communicating with client system 7010 via a mobile network (e.g., GSM, PCS, Wi-Fi, WPAN, etc.). In some embodiments, one server may be able to communicate with client system 7010 over both the Internet and a mobile network. In other embodiments, separate servers can be used.

Client system 7010 can receive and transmit data 7070 to and from game networking system 7030. This data can include, for example, webpages, messages, game inputs, game displays, HTTP packets, data requests, transaction information, updates, and other suitable data. At some other time, or at the same time, game networking system 7030 can communicate data 7080, 7090 (e.g., game state information, game system account information, page info, messages, data requests, updates, etc.) with other networking systems, such as social networking system 7020 (e.g., Facebook, Myspace, Google+, etc.). Client system 7010 can also receive and transmit data 7100 to and from social networking system 7020. This data can include, for example, webpages, messages, social graph information, social network displays, HTTP packets, data requests, transaction information, updates, and other suitable data.

Communication between client system 7010, social networking system 7020, and game networking system 7030 can occur over any appropriate electronic communication medium or network using any suitable communications protocols. For example, client system 7010, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as HTTP-S, FTP, SNMP, TELNET, and a number of other protocols, may be used. In addition, a server in one interaction context may be a client in another interaction context. In particular embodiments, the information transmitted between hosts may be formatted as HyperText Markup Language (HTML) documents. Other structured document languages or formats can be used, such as XML and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called Binary Large Object (BLOB). When a player accesses an online game on game networking system 7030, the BLOB containing the game state for the instance corresponding to the player can be transmitted to client system 7010 for use by a client-side executed object to process. In particular embodiments, the client-side executable may be a FLASH-based game, which can de-serialize the game state data in the BLOB. As a player plays the game, the game logic implemented at client system 7010 maintains and modifies the various game state parameters locally. The client-side game logic may also batch game events, such as mouse clicks, and transmit these events to game networking system 7030. Game networking system 7030 may itself operate by retrieving a copy of the BLOB from a database or an intermediate memory cache (memcache) layer. Game networking system 7030 can also de-serialize the BLOB to resolve the game state parameters and execute its own game logic based on the events in the batch file of events transmitted by the client to synchronize the game state on the server side. Game networking system 7030 may then re-serialize the game state, now modified, into a BLOB, and pass this to a memory cache layer for lazy updates to a persistent database.

With a client-server environment in which the online games may run, one server system, such as game networking system 7030, may support multiple client systems 7010. At any given time, there may be multiple players at multiple client systems 7010 all playing the same online game. In practice, the number of players playing the same game at the same time may be very large. As the game progresses with each player, multiple players may provide different inputs to the online game at their respective client systems 7010, and multiple client systems 7010 may transmit multiple player inputs and/or game events to game networking system 7030 for further processing. In addition, multiple client systems 7010 may transmit other types of application data to game networking system 7030.

In particular embodiments, a computed-implemented game may be a text-based or turn-based game implemented as a series of web pages that are generated after a player selects one or more actions to perform. The web pages may be displayed in a browser client executed on client system 7010. As an example and not by way of limitation, a client application downloaded to client system 7010 may operate to serve a set of webpages to a player. As another example and not by way of limitation, a computer-implemented game may be an animated or rendered game executable as a stand-alone application or within the context of a webpage or other structured document. In particular embodiments, the computer-implemented game may be implemented using Adobe FLASH-based technologies. As an example and not by way of limitation, a game may be fully or partially implemented as a SWF object that is embedded in a web page and executable by a Flash media player plug-in. In particular embodiments, one or more described webpages may be associated with or accessed by social networking system 7020. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time. When an update to an application datum occurs at client system 7010, either caused by an action of a game player or by the game logic itself, client system 7010 may need to inform game networking system 7030 of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, system 7000 is discussed in reference to updating a multi-player online game hosted on a network-addressable system (such as, for example, social networking system 7020 or game networking system 7030), where an instance of the online game is executed remotely on a client system 7010, which then transmits application event data to the hosting system such that the remote game server synchronizes the game state associated with the instance executed by the client system 7010.

In a particular embodiment, one or more objects of a game may be represented as an Adobe Flash object. Flash may manipulate vector and raster graphics, and supports bidirectional streaming of audio and video. "Flash" may mean the authoring environment, the player, or the application files. In particular embodiments, client system 7010 may include a Flash client. The Flash client may be configured to receive and run Flash application or game object code from any suitable networking system (such as, for example, social networking system 7020 or game networking system 7030). In particular embodiments, the Flash client may be run in a browser client executed on client system 7010. A player can interact with Flash objects using client system 7010 and the Flash client. The Flash objects can represent a variety of in-game objects. Thus, the player may perform various in-game actions on various in-game objects by making various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the Flash object shown to the player at client system 7010, the Flash client may send the events that caused the game state changes to the in-game object to game networking system 7030. However, to expedite the processing and hence the speed of the overall gaming experience, the Flash client may collect a batch of some number of events or updates into a batch file. The number of events or updates may be determined by the Flash client dynamically or determined by game networking system 7030 based on server loads or other factors. For example, client system 7010 may send a batch file to game networking system 7030 whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at client system 7010. In particular embodiments, the batch file may be a text file and the name-value pairs may be in string format.

In particular embodiments, when a player plays an online game on client system 7010, game networking system 7030 may serialize all the game-related data, including, for example and without limitation, game states, game events, and user inputs, for this particular user and this particular game into a BLOB and store the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game the player is in. When a player resumes playing the game next time, game networking system 7030 may retrieve the corresponding BLOB from the database to determine the most-recent values of the game-related data. In particular embodiments, while a player is playing the online game, game networking system 7030 may also load the corresponding BLOB into a memory cache so that the game system may have faster access to the BLOB and the game-related data contained therein.

Systems and Methods

In particular embodiments, one or more described webpages may be associated with a networking system or networking service. However, alternate embodiments may have application to the retrieval and rendering of structured documents hosted by any type of network addressable resource or web site. Additionally, as used herein, a user may be an individual, a group, or an entity (such as a business or third party application).

Figure 8:
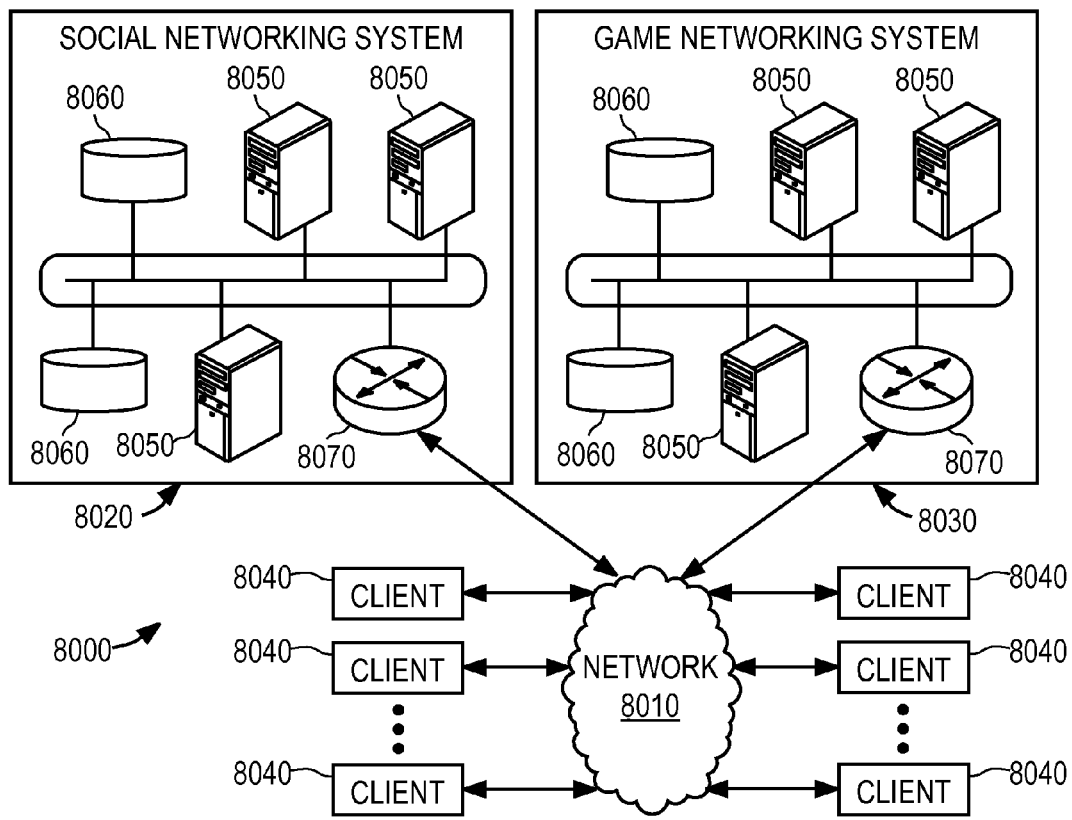
FIG. 8 shows a schematic of a gaming system according to some examples of the present disclosure.

Particular embodiments may operate in a WAN environment, such as the Internet, including multiple network addressable systems. FIG. 8 illustrates an example network environment 8000, in which various example embodiments may operate. Network cloud 8010 generally represents one or more interconnected networks, over which the systems and hosts described herein, can communicate. Network cloud 8010 may include packet-based WAN (such as the Internet), private networks, wireless networks, satellite networks, cellular networks, paging networks, and the like. As FIG. 8 illustrates, particular embodiments may operate in a network environment comprising one or more networking systems, such as social networking system 8020, game networking system 8030, and one or more client systems 8040. The components of social networking system 8020 and game networking system 8030 operate analogously; as such, hereinafter they may be referred to simply as a networking system. Client systems 8040 are operably connected to the network environment via a network service provider, a wireless carrier, or any other suitable means.

Networking system 8020, 8030 is a network addressable system that, in various example embodiments, comprises one or more physical servers 8050 and data stores 8060. The one or more physical servers 8050 are operably connected to computer network 8010 via, by way of example, a set of routers and/or networking switches 8070. In an example embodiment, the functionality hosted by the one or more physical servers 8050 may include web or HTTP servers, FTP servers, as well as, without limitation, webpages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), Flash, ActionScript, and the like.

Physical servers 8050 may host functionality directed to the operations of networking system 8020, 8030. Hereinafter servers 8050 may be referred to as server 8050, although server 8050 may include numerous servers hosting, for example, networking system 8020, 8030, as well as other content distribution servers, data stores, and databases. Data store 8060 may store content and data relating to, and enabling, operation of networking system 8020, 8030 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, and the like. Logically, data store 8060 corresponds to one or more of a variety of separate and integrated databases, such as relational databases and object-oriented databases, that maintain information as an integrated collection of logically related records or files stored on one or more physical systems. Structurally, data store 8060 may generally include one or more of a large class of data storage and management systems. In particular embodiments, data store 8060 may be implemented by any suitable physical system(s) including components, such as one or more database servers, mass storage media, media library systems, storage area networks, data storage clouds, and the like. In one example embodiment, data store 8060 includes one or more servers, databases (e.g., MySQL), and/or data warehouses. Data store 8060 may include data associated with different networking system 8020, 8030 users and/or client systems 8040.

Client system 8040 is generally a computer or computing device including functionality for communicating (e.g., remotely) over a computer network. Client system 8040 may be a desktop computer, laptop computer, personal digital assistant (PDA), in-or out-of-car navigation system, smart phone or other cellular or mobile phone, or mobile gaming device, among other suitable computing devices. Client system 8040 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 8040 to enter addresses of specific network resources to be retrieved, such as resources hosted by networking system 8020, 8030. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is the Hypertext Markup Language (HTML). Other common web browser-supported languages and technologies include the Extensible Markup Language (XML), the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 8040 desires to view a particular webpage (hereinafter also referred to as target structured document) hosted by networking system 8020, 8030, the user's web browser, or other document rendering engine or suitable client application, formulates and transmits a request to networking system 8020, 8030. The request generally includes a URL or other document identifier as well as metadata or other information. By way of example, the request may include information identifying the user, such as a user ID, as well as information identifying or characterizing the web browser or operating system running on the user's client computing device 8040. The request may also include location information identifying a geographic location of the user's client system or a logical network location of the user's client system. The request may also include a timestamp identifying when the request was transmitted.

Although the example network environment described above and illustrated in FIG. 9 is described with respect to social networking system 8020 and game networking system 8030, this disclosure encompasses any suitable network environment using any suitable systems. As an example and not by way of limitation, the network environment may include online media systems, online reviewing systems, online search engines, online advertising systems, or any combination of two or more such systems.

Modules, Components, and Logic

Certain embodiments are described herein as including logic or a number of components, modules, or mechanisms. Modules or components may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., a field programmable gate array (FPGA) or an application-specific integrated circuit (ASIC).

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Implementation

Figure 9:
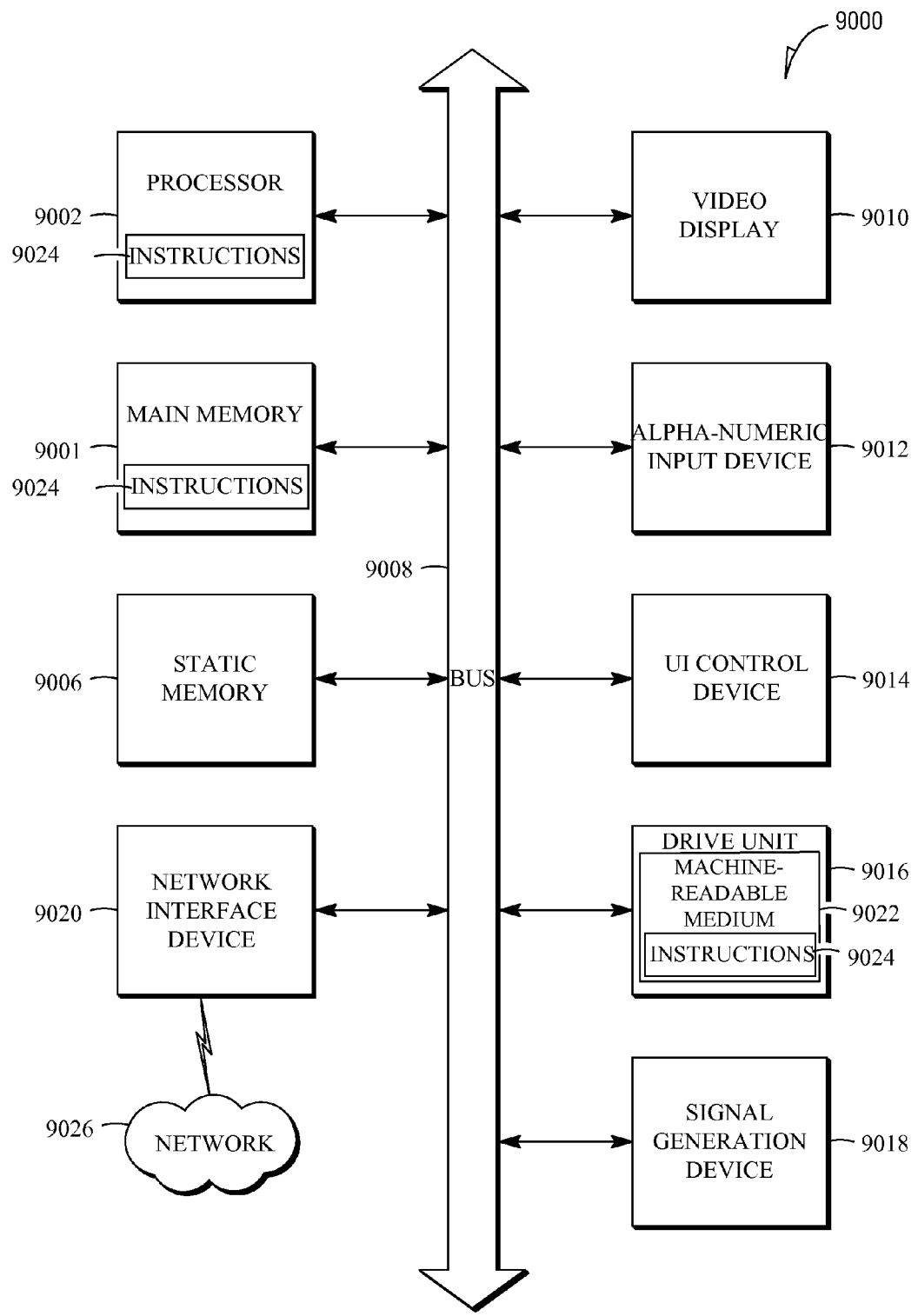
FIG. 9 shows a schematic of a machine implementation according to some examples of the present disclosure.

FIG. 9 shows a diagrammatic representation of a machine in the example form of a computer system 9000 within which a set of instructions for causing the machine to perform any one or more of the methods, processes, operations, or methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a Personal Computer (PC), a tablet PC, a Set-Top Box (STB), a Personal Digital Assistant (PDA), a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments may also be practiced in distributed system environments where local and remote computer systems which that are linked (e.g., either by hardwired, wireless, or a combination of hardwired and wireless connections) through a network, both perform tasks. In a distributed system environment, program modules may be located in both local and remote memory-storage devices (see below).

The example computer system 9000 includes a processor 9002 (e.g., a Central Processing Unit (CPU), a Graphics Processing Unit (GPU) or both), a main memory 9001 and a static memory 9006, which communicate with each other via a bus 9008. The computer system 9000 may further include a video display unit 9010 (e.g., a Liquid Crystal Display (LCD) or a Cathode Ray Tube (CRT)). The computer system 9000 also includes an alphanumeric input device 9012 (e.g., a keyboard), a User Interface (UI) controller 9014 (e.g., a mouse), a disk drive unit 9016, a signal generation device 9018 (e.g., a speaker) and a network interface device 9020 (e.g., a transmitter).

The disk drive unit 9016 includes a machine-readable medium 9022 on which is stored one or more sets of instructions 9024 and data structures (e.g., software) embodying or used by any one or more of the methodologies or functions illustrated herein. The software may also reside, completely or at least partially, within the main memory 9001 and/or within the processor 9002 during execution thereof by the computer system 9000, the main memory 9001 and the processor 9002 also constituting machine-readable media.

The instructions 9024 may further be transmitted or received over a network 9026 via the network interface device 9020 using any one of a number of well-known transfer protocols (e.g., HTTP, Session Initiation Protocol (SIP)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any of the one or more of the methodologies illustrated herein. The term "machine-readable medium" shall accordingly be taken to include, but not be limited to, solid-state memories, and optical and magnetic medium.

Method embodiments illustrated herein may be computer-implemented. Some embodiments may include computer-readable media encoded with a computer program (e.g., software), which includes instructions operable to cause an electronic device to perform methods of various embodiments. A software implementation (or computer-implemented method) may include microcode, assembly language code, or a higher-level language code, which further may include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, Random Access Memories (RAMs), Read Only Memories (ROMs), and the like.

Additional Notes and Examples

Disclosed in some examples is a method of providing a computer-implemented game, the method includes rendering a display of a virtual in-game environment comprising an unlocked area and a locked area, an in-game player character controlled by a player of the game having access to the unlocked areas but being restricted from accessing the locked area; and using one or more processors, applying a visual effect to the locked area to distinguish the locked area from the unlocked area, the visual effect revealing one or more aspects of the unlocked area.

Disclosed in some examples is a system for providing a computer-implemented game, the system including a rendering module configured to render a display of a virtual in-game environment comprising an unlocked area and a locked area, an in-game player character controlled by a player of the game having access to the unlocked areas but being restricted from accessing the locked area; and a visual effect module configured to apply a visual effect to the locked area to distinguish the locked area from the unlocked area, the visual effect revealing one or more aspects of the unlocked area using one or more computer processors.

Disclosed in some examples is a machine readable medium that stores instructions which when performed by a machine, cause the machine to perform certain operations. In some examples the operations can include rendering a display of a virtual in-game environment comprising an unlocked area and a locked area, an in-game player character controlled by a player of the game having access to the unlocked areas but being restricted from accessing the locked area; and using one or more processors, applying a visual effect to the locked area to distinguish the locked area from the unlocked area, the visual effect revealing one or more aspects of the unlocked area.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method of providing a computer-implemented game, the method comprising:
  rendering a display of a virtual in-game environment comprising an unlocked area and a locked area, an in-game player character controlled by a player of the game having access to the unlocked areas but being restricted from accessing the locked area; and
  using one or more processors, applying a visual effect to the locked area to distinguish the locked area from the unlocked area, applying the visual effect to the locked area including obscuring at least one property of one or more game objects located in the locked area, the visual effect revealing one or more aspects of the unlocked area and being applied to the locked area such that respective locations of the one or more game objects located in the locked area are revealed.

2. The method of claim 1, further comprising revealing at least one obscured property of a particular game object of the one or more game objects located in the locked area responsive to player interaction with the particular game object.

3. The method of claim 2, further comprising displaying a message in association with the particular game object responsive to player interaction therewith.

4. The method of claim 1, wherein the visual effect is applied to the locked area such that respective locations of the one or more game objects located in the locked area that represent non-player characters are revealed.

5. The method of claim 4, wherein the visual effect is applied to the locked area such that respective silhouettes of the one or more non-player characters in the locked area are revealed.

6. The method of claim 1, wherein the visual effect is applied such that a topological layout of the locked area is revealed.

7. The method of claim 1, further comprising:
determining whether a map section in the virtual in-game environment forms part of the locked area or the unlocked area by comparing a pre-defined unlocking requirement for the map section with game state data of a player associated with the map section; and
responsive to determining that the map section forms part of the locked area, applying the visual effect to the map section.

8. A system for providing a computer-implemented game, the system comprising:
a rendering module configured to render a display of a virtual in-game environment comprising an unlocked area and a locked area, an in-game player character controlled by a player of the game having access to the unlocked areas but being restricted from accessing the locked area; and
a visual effect module configured to apply a visual effect to the locked area to distinguish the locked area from the unlocked area, the visual effect revealing one or more aspects of the unlocked area, the visual effect being applied to the locked area such that respective locations of one or more game objects located in the locked area are revealed, the visual effect being applied to the locked area to obscure at least one property of the one or more game objects located in the locked area, and the visual effect being applied using one or more computer processors.

9. The system of claim 8, wherein the visual effect module is configured to remove the visual effect from a particular game object of the one or more game objects located in the locked area responsive to player interaction with the particular game object.

10. The system of claim 9, further comprising a display module configured to display a message in association with the particular game object responsive to player interaction therewith.

11. The system of claim 8, wherein the visual effect module is configured to apply the effect to the locked area such that respective locations of one or more game objects representing non-player characters located in the locked area are revealed.

12. The system of claim 11, wherein the visual effect module is configured to apply the effect to the locked area such that respective silhouettes of the one or more non-player characters in the locked area are revealed.

13. The system of claim 8, wherein the visual effect module is configured to apply the effect to the locked area such that a topological layout of the locked area is revealed.

14. The system of claim 8, wherein:
the visual effect module is configured to:
determine whether a map section in the virtual in-game environment forms part of the locked area or the unlocked area by comparing a pre-defined unlocking requirement for the map section with game state data of a player associated with the map section; and
responsive to determining that the map section forms part of the locked area, apply the visual effect to the map section.

15. The system of claim 8, wherein the visual effect module is configured to render one or more preview effects in the locked area responsive to player interaction with the locked area.

16. A non-transitory machine readable medium that stores instructions which when performed by a machine, cause the machine to perform operations comprising:
rendering a display of a virtual in-game environment comprising an unlocked area and a locked area, an in-game player character controlled by a player of the game having access to the unlocked areas but being restricted from accessing the locked area; and
applying a visual effect to the locked area to distinguish the locked area from the unlocked area, applying the visual effect to the locked area including obscuring at least one property of one or more game objects located in the locked area, the visual effect revealing one or more aspects of the unlocked area and being applied to the locked area such that respective locations of the one or more game objects located in the locked area are revealed.

17. The non-transitory machine-readable medium of claim 16, wherein the instructions include instructions which when performed by the machine, cause the machine to perform operations comprising revealing at least one obscured property of a particular game object of the one or more game objects located in the locked area responsive to player interaction with the particular game object.

18. The non-transitory machine-readable medium of claim 17, wherein the instructions include instructions which when performed by the machine, cause the machine to perform operations comprising displaying a message in association with the particular game object responsive to player interaction therewith.

19. The non-transitory machine-readable medium of claim 16, wherein the instructions include instructions, which when performed by the machine, cause the machine to apply the visual effect to the locked area such that respective locations of the one or more game objects located in the locked area that represent non-player characters are revealed.

20. The non-transitory machine-readable medium of claim 19, wherein the instructions include instructions, which when performed by the machine, cause the machine to apply the visual effect to the locked area such that respective silhouettes of the one or more non-player characters in the locked area are revealed.

21. The non-transitory machine-readable medium of claim 16, wherein the instructions include instructions, which when performed by the machine, cause the machine to apply the visual effect such that a topological layout of the locked area is revealed.

22. The non-transitory machine-readable medium of claim 16, wherein the instructions include instructions, which when performed by the machine, cause the machine to:
determine whether a map section in the virtual in-game environment forms part of the locked area or the unlocked area by comparing a pre-defined unlocking requirement for the map section with game state data of a player associated with the map section; and
responsive to determining that the map section forms part of the locked area, apply the visual effect to the map section.

* * * * *